(12) United States Patent
Lang et al.

(10) Patent No.: US 10,029,258 B2
(45) Date of Patent: Jul. 24, 2018

(54) CLOSED SYSTEM CHEMICAL HANDLING AND DELIVERY SYSTEM AND METHOD

(71) Applicant: Pentair Flow Technologies, LLC, Delavan, WI (US)

(72) Inventors: John Philip Lang, Inver Grove Heights, MN (US); Andrew Lee Johnson, Oakdale, MN (US); Benjamin Carl Larson, Roseville, MN (US)

(73) Assignee: Pentair Flow Technologies, LLC, Delavan, WI (US)

( * ) Notice: Subject to any disclaimer, the term of this patent is extended or adjusted under 35 U.S.C. 154(b) by 182 days.

(21) Appl. No.: 15/087,530

(22) Filed: Mar. 31, 2016

(65) Prior Publication Data
US 2016/0288125 A1 Oct. 6, 2016

Related U.S. Application Data

(60) Provisional application No. 62/141,102, filed on Mar. 31, 2015.

(51) Int. Cl.
| | |
|---|---|
| *B01L 3/00* | (2006.01) |
| *B08B 15/02* | (2006.01) |
| *G03D 17/00* | (2006.01) |
| *B25J 21/00* | (2006.01) |
| *B25J 21/02* | (2006.01) |

(52) U.S. Cl.
CPC ............ *B01L 3/523* (2013.01); *B08B 15/026* (2013.01); *B01L 3/56* (2013.01); *B01L 3/567* (2013.01); *B01L 2200/082* (2013.01); *B01L 2200/141* (2013.01); *B01L 2300/0681* (2013.01); *B01L 2400/0605* (2013.01); *B01L 2400/0644* (2013.01); *B25J 21/00* (2013.01); *B25J 21/02* (2013.01); *G03D 17/00* (2013.01)

(58) Field of Classification Search
CPC .. B01L 3/523; B01L 3/567; B01L 3/56; B01L 2200/141; B01L 2200/082; B25J 21/00; B25J 21/02; G03D 17/00
See application file for complete search history.

(56) References Cited

U.S. PATENT DOCUMENTS

| | | |
|---|---|---|
| 2,795,403 A | 6/1957 | Mead |
| 2,797,530 A | 7/1957 | Garver |
| 3,072,040 A | 1/1963 | Triplett |
| 3,376,022 A | 4/1968 | Gleockler |

(Continued)

FOREIGN PATENT DOCUMENTS

| | | |
|---|---|---|
| CN | 102319548 A | 1/2012 |
| JP | 2002045709 A | 2/2002 |

*Primary Examiner* — Matthew W Jellett
*Assistant Examiner* — Christopher Ballman
(74) *Attorney, Agent, or Firm* — Quarles & Brady LLP

(57) ABSTRACT

A closed system chemical handling and delivery system includes an enclosure having a sealable opening accommodating the ingress and egress of chemical containers with an interior of the enclosure, a glove opening formed in the enclosure to which a glove is attached to and extends into the interior of the enclosure, a viewing window coupled to the enclosure providing a view into the interior of the enclosure, a chemical delivery drain in fluid communication with the interior of the enclosure, and a mixing valve in selective fluid communication with the chemical delivery drain.

19 Claims, 10 Drawing Sheets

(56) References Cited

U.S. PATENT DOCUMENTS

| | | | |
|---|---|---|---|
| 3,986,835 A * | 10/1976 | Takagi | B08B 15/023 |
| | | | 422/159 |
| 4,142,545 A | 3/1979 | Billigmeier | |
| 5,143,102 A | 9/1992 | Blaul | |
| 5,222,511 A | 6/1993 | Mikkelsen et al. | |
| 5,239,787 A | 8/1993 | Abbott et al. | |
| 5,262,578 A | 11/1993 | Hall | |
| 5,704,381 A | 1/1998 | Millan et al. | |
| 5,730,765 A | 3/1998 | Henry et al. | |
| 5,743,637 A * | 4/1998 | Ogier | B01F 3/12 |
| | | | 138/44 |
| 6,024,796 A | 2/2000 | Salazar et al. | |
| 6,370,972 B1 | 4/2002 | Bomber et al. | |
| 6,796,704 B1 | 9/2004 | Lott | |
| 6,974,197 B1 * | 12/2005 | Henry | B01L 1/50 |
| | | | 312/1 |
| 7,780,248 B2 * | 8/2010 | Granadino | G01M 3/226 |
| | | | 312/1 |
| RE43,418 E | 5/2012 | Zambaux | |
| 8,337,776 B1 * | 12/2012 | D'Onofrio | B25J 21/02 |
| | | | 422/297 |
| 8,667,841 B1 * | 3/2014 | Noya | G01M 15/02 |
| | | | 73/426 |
| 2001/0004182 A1 | 6/2001 | Bennison | |
| 2006/0130752 A1 * | 6/2006 | McLaughlin | B05B 15/1203 |
| | | | 118/313 |
| 2006/0266427 A1 | 11/2006 | Otero | |
| 2008/0031082 A1 | 2/2008 | Zambaux | |
| 2013/0061567 A1 * | 3/2013 | Kawasaki | B01L 1/04 |
| | | | 55/385.2 |

\* cited by examiner

CLOSED SYSTEM CHEMICAL HANDLING AND DELIVERY SYSTEM AND METHOD

RELATED APPLICATION

This application claims priority under 35 U.S.C. § 119 to U.S. Provisional Patent Application No. 62/141,102 filed on Mar. 31, 2015, the entire contents of which are incorporated herein by reference.

BACKGROUND

This invention relates to a closed system chemical handling and delivery system and method. More particularly, this invention relates to devices and methods for handling, mixing, diluting, and/or delivering chemicals under vacuum into a streamline.

The use and handling of various chemicals, such as agricultural chemicals, are subject to a range of regulations and best practices. Direct or prolonged exposure to certain chemicals may have adverse effects on the handlers of these chemicals, such that excessive exposure is typically minimized. In addition, contamination of the surrounding environment with these chemicals is preferably minimized or eliminated.

One particular issue arises when these chemicals are being prepared for introduction into a streamline for downstream application. "Closed systems" for chemical mixing and diluting have been proposed to minimize a handler's exposure to the chemicals being handled, and any ensuing undesirable environmental contamination. For example, one type of "closed system" is commonly referred to as a Goodwin-type box. Goodwin-type boxes provide a sealed-off environment, typically in the form of a metal enclosure, allowing a handler to place entire containers of chemicals inside the enclosure before sealing off the enclosure. The handler can then actuate a handle or lever that causes a series of knives/blades to move within the enclosure puncturing the containers, thus allowing the chemicals to mix within the enclosure. This approach disadvantageously requires use of an entire chemical container as there is no reasonably practical way to reseal a punctured chemical container. In addition, once a chemical container is sealed within a Goodwin-type box, there is no access to the container to meter a desired amount of chemicals, resulting in chemical waste or required pre-mixing measurements that have the potential to undesirably expose the handler and the ambient environment to the various chemicals.

Other types of mixing systems require a handler to place adapters and hoses directly onto the chemical containers and then mix the chemicals together. This type of "open" mixing increases the possibility of both handler and environmental exposure to the chemicals. Moreover, dry or powder chemicals are not amicable to this type of mixing.

There is a need for a closed system chemical handling and delivery system and method that allows for handling, mixing, diluting, and/or delivery of a measured amount of chemicals, in a sealed environment, while also having the flexibility to accommodate liquid and powder chemicals for delivery under vacuum into a streamline.

SUMMARY OF THE INVENTION

Some embodiments of the invention provide a closed system chemical handling and delivery system comprising an enclosure having a sealable opening accommodating the ingress and egress of chemical containers with an interior of the enclosure. A glove opening is formed in the enclosure to which a glove is attached to and extends into the interior of the enclosure. A viewing window is coupled to the enclosure providing a view into the interior of the enclosure. A chemical delivery drain is in fluid communication with the interior of the enclosure, and a mixing valve is in selective fluid communication with the chemical delivery drain.

Some embodiments of the invention provide a closed system chemical handling and delivery system comprising an enclosure having a sloped top-front surface defining a sealable opening accommodating the ingress and egress of chemical containers with an interior of the enclosure. A pair of glove openings are formed in a front surface of the enclosure to which a pair of gloves are attached to and extend into the interior of the enclosure. A viewing window is moveably coupled to the enclosure between an open position and a closed position. A fastener is engaged with the enclosure and the viewing window when the viewing window is in the closed position to seal the viewing window to the enclosure. A chemical delivery drain is in fluid communication with the interior of the enclosure. The chemical delivery drain includes a cylindrical portion having a generally vertical wall defining an arcuate recess that is contoured to transition into a curvature of the vertical wall, and the cylindrical portion transitions into a conical portion that defines a downstream portion of the chemical delivery drain having a drain opening. A mixing nozzle assembly is mounted in the arcuate recess to introduce fluid from the mixing nozzle assembly cyclonically into the cylindrical portion to spiral downward into the conical portion. A mixing valve is coupled to the drain opening and is in selective fluid communication with the chemical delivery drain.

Some embodiments of the invention provide a closed system chemical handling and delivery method comprising the steps of placing a chemical container having chemical product therein inside a closed system chemical handling and delivery system. The system has an enclosure with a sealable opening accommodating the ingress and egress of the chemical container with an interior of the enclosure, a glove opening formed in the enclosure to which a glove is attached to and extends into the interior of the enclosure, a viewing window coupled to the enclosure providing a view into the interior of the enclosure, a chemical delivery drain in fluid communication with the interior of the enclosure, and a mixing valve in selective fluid communication with the chemical delivery drain. The method includes sealing the sealable opening such that the interior of the enclosure is substantially quarantined from an external environment. The method further includes introduction of a desired amount of the chemical product to the chemical delivery drain and selective actuation of the mixing valve to dispense the chemical product through the mixing valve.

These and other features, aspects, and advantages of the present invention will become better understood upon consideration of the following detailed description, drawings, and appended claims.

DETAILED DESCRIPTION

Figure 1:
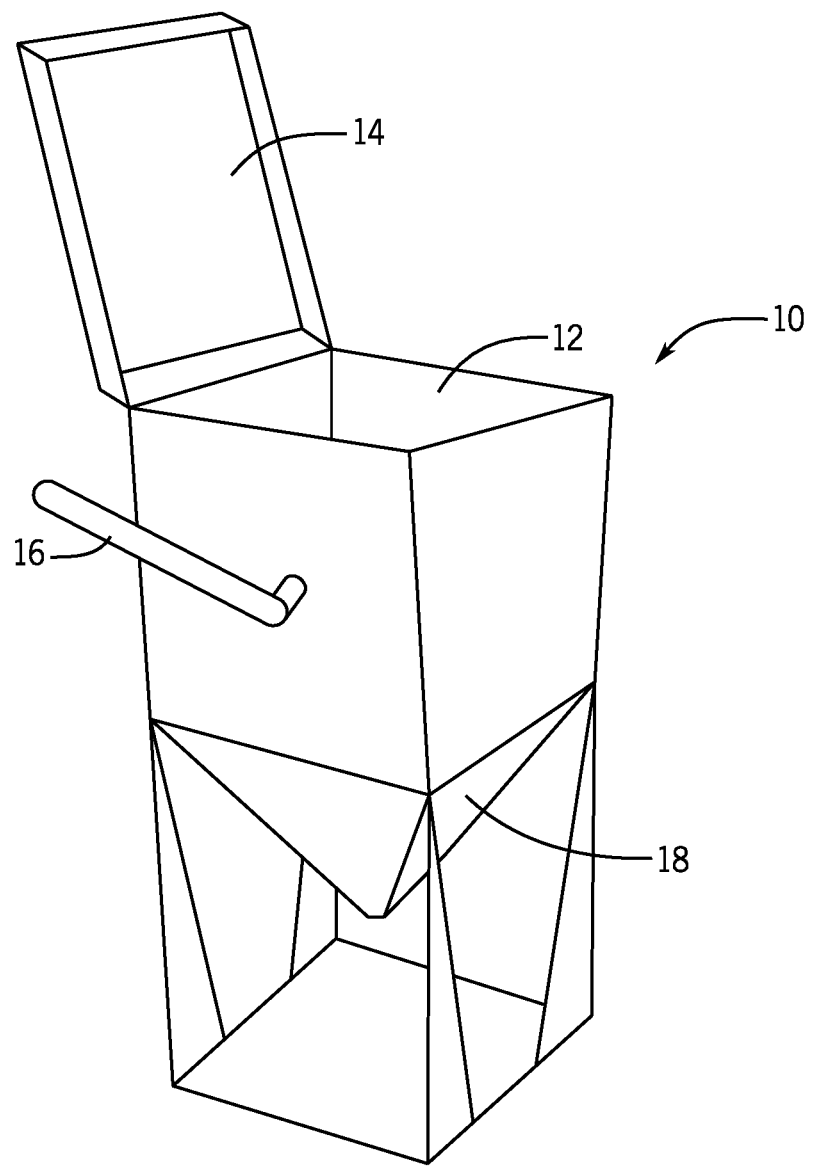
FIG. 1 is a perspective view of a related art closed system device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having," and variations thereof, herein is meant to encompass the items listed thereafter and equivalents thereof as well as additional items. Unless specified or limited otherwise, the terms "attached," "connected," and "coupled," and variations thereof, are used broadly and encompass both direct and indirect mountings, connections, supports, and couplings. Further, "attached," "connected," and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a conventional related art closed system assembly 10. The conventional closed system 10 includes a mix tank 12 and an access cover 14. One or more chemical containers (not shown) can be placed into the mix tank 12. Once the chemical container(s) have been placed into the mix tank 12 and the access cover 14 closed, a lever 16 can be activated to cause a series of knives or blades located within the mix tank 12 to extend and puncture the nearby chemical container(s), thus releasing chemicals from the containers into the mix tank 12. The mixture of chemicals flows down the funnel 18, which can be connected to discharge pipes (not shown) and directed to a downstream sprayer (not shown). As noted above, such a conventional closed system 10 suffers from numerous drawbacks.

FIGS. 2-12 illustrate one embodiment of a closed system chemical handling and delivery system 100. The closed system chemical handling system 100 establishes an environmentally isolated system for the handling and delivery of chemicals to, for example, a streamline. The system 100 includes an enclosure 110 having a sealable opening 112 accommodating the ingress and the egress of chemical containers (not shown) into and out of an interior 114 of the enclosure 110. A left glove opening 116 and a right glove opening 118 are formed in the enclosure 110. A left glove 120 is attached to the left glove opening 116 and a right glove 122 is attached to the right glove opening 118, such as with an adjustable band clamp 119 or any other means sufficient to seal the gloves 120, 122 in the respective glove openings 116, 118. Both the left glove 120 and the right glove 122 extend into the interior 114 of the enclosure 110. A viewing window 124 is coupled to the enclosure 110 and provides a handler a view or line of sight into the interior 114 of the enclosure 110. A chemical delivery drain 126 is in fluid communication with the interior 114 of the enclosure 110, and a mixing valve 128, such as an eductor valve or venturi-type valve, is in selective fluid communication with the chemical delivery drain 126. With the fundamental components of the system 100 identified, each will be described below in further detail.

With specific reference to FIGS. 2-6, the system 100 can be supported by a base stand 130 including a series of support legs 132 and cross members 134 that elevate and position the system 100, including the enclosure 110 and the mixing valve 128. The base stand 130 can also be adjustable to different positions and elevations. The enclosure 110 is coupled to the base stand 130 via a series of fasteners 133 (e.g., fir tree fasteners, rivets, etc.) that partially extend through openings 131 in the base stand 130 and secure with pockets 111 in the enclosure 110, shown in FIG. 7. A variety of other constructions and configurations are available to support, place, and restrain the system 100 depending on the particular application requirements.

The enclosure 110 is generally box-shaped, with a sloped top-front surface 136 oriented to accommodate a handler viewing the interior 114. In one embodiment, the enclosure 110 includes an integral substantially conical delivery drain 126. In other forms, the conical delivery drain 126 can be a separate component that is assembled with or attached to the other structures of the enclosure 110. The enclosure 110 can be made of any material suitable for the particular application, and may include materials such as stainless steel and plastics (e.g., thermosets or thermoplastic polymers, including polypropylene or polyethylene). The opening 112 is formed in the sloped top-front surface 136, is generally rectangular, and is preferably sized to accommodate the ingress and the egress of application-specific chemical containers.

Figure 9:
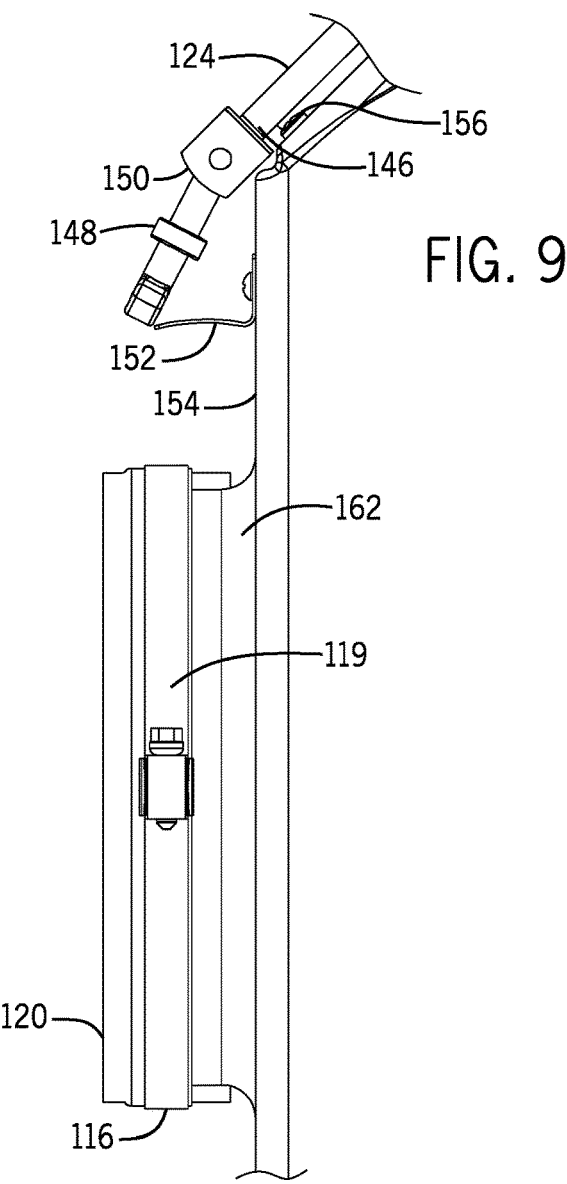
FIG. 9 is a detailed view of the area circumscribed by arc 9-9 shown in FIG. 4.
Figure 10:
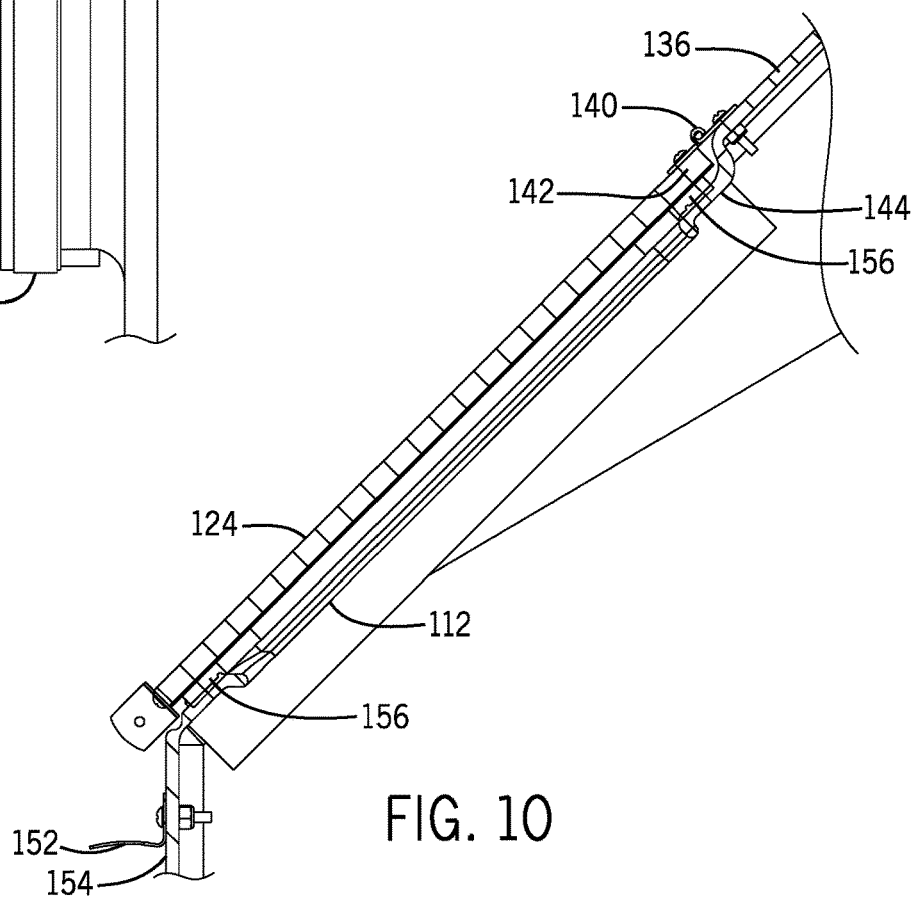
FIG. 10 is a detailed view of the area circumscribed by arc 10-10 shown in FIG. 5.
Figure 11:
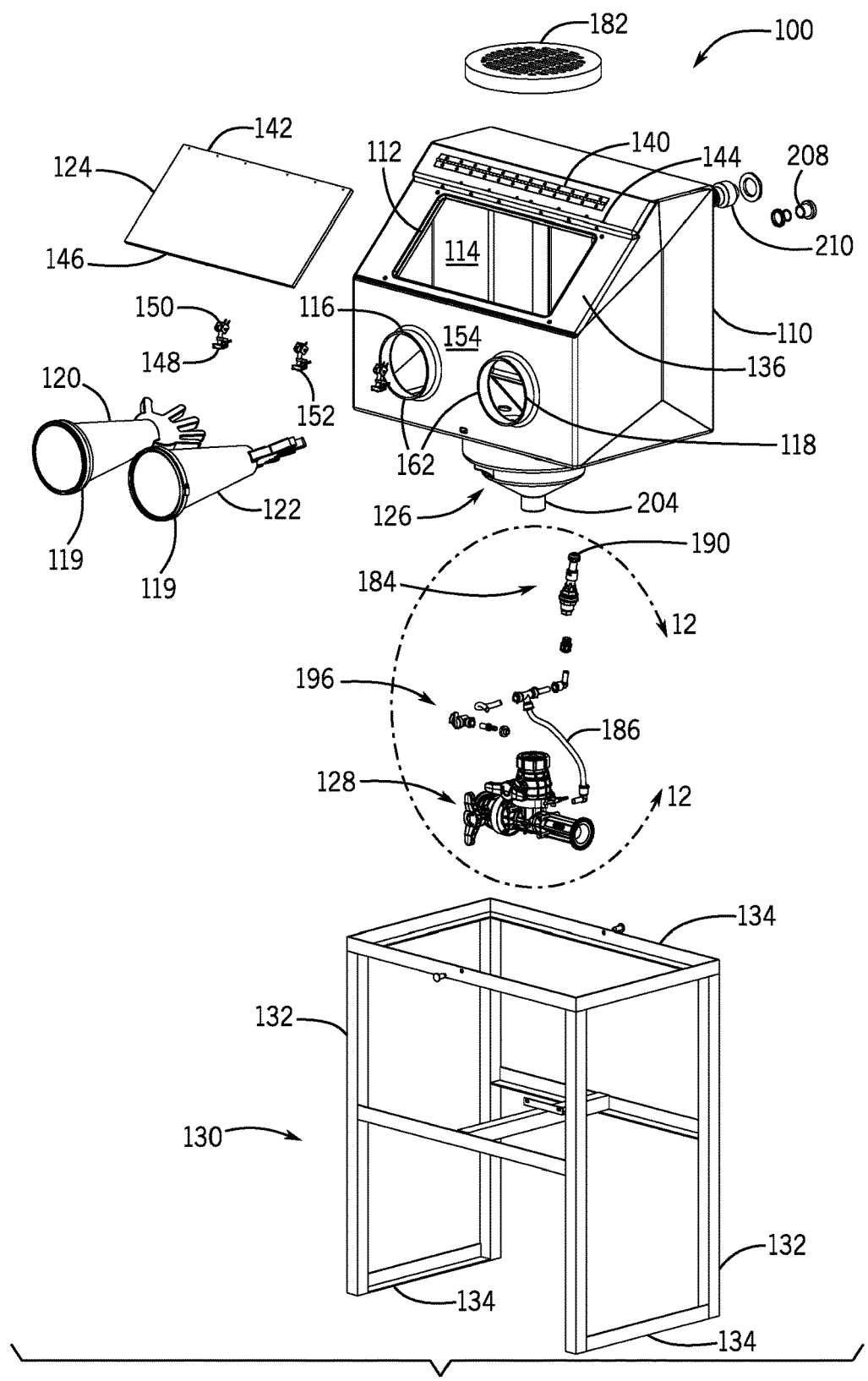
FIG. 11 is an isometric exploded view of the closed system chemical handling and delivery system shown in FIG. 2.
Figure 12:
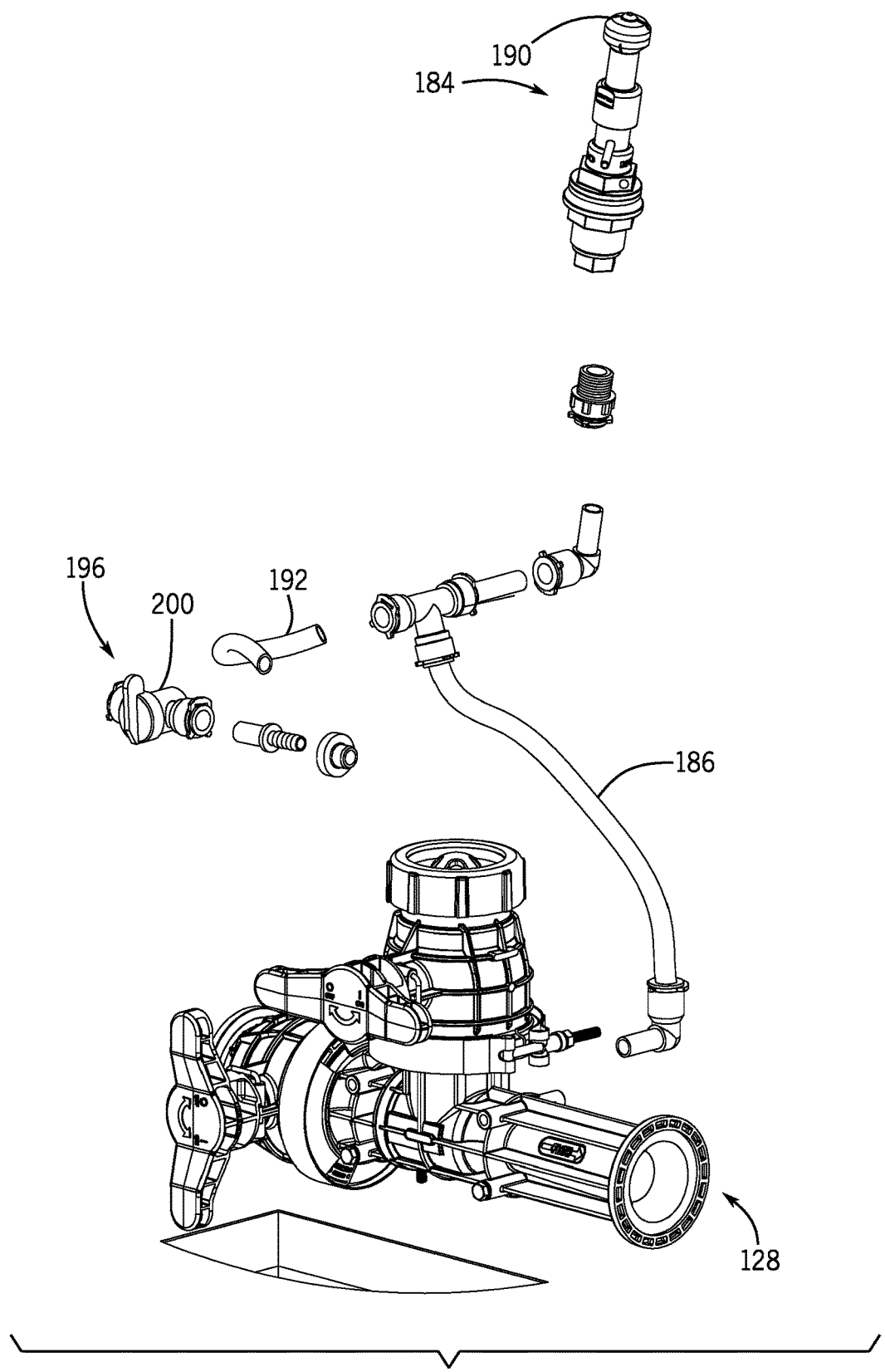
FIG. 12 is a partial isometric exploded view of the area circumscribed by arc 12-12 shown in FIG. 11.

With additional reference to FIGS. 9 and 10, the viewing window 124 in the example embodiment, when in a closed position, provides a handler visual access and a line of sight into the interior 114 of the enclosure 110, and also selectively seals the opening 112 by generally engaging with the surrounding sloped top-front surface 136 of the enclosure 110. The viewing window 124 can be made of a transparent material, such as plastic or glass, and can be comprised of multiple portions sized to cover discrete segments of the opening 112 that together cover the entire opening 112. A piano-type hinge 140 is secured to both an upper edge portion 142 of the viewing window 124 and the upper frame portion 144 adjacent to the opening 112. The piano-type hinge 140 can be secured with fasteners (e.g., bolts/nuts, screws, adhesives, rivets, and the like) in a manner that maintains a substantially sealed connection, thus inhibiting the escape of chemicals from within the interior 114 of the enclosure 110. In addition, other types of attachment mechanisms can be incorporated to provide pivoting, sliding, or other movement of the viewing window 124 (or separate cover), and the location of the attachment mechanism can be at other locations (e.g., a vertical edge of the viewing window 124).

The lower edge portion 146 of the viewing window 124 includes several T-handle fasteners 148 that are pivotally coupled to a mount 150 secured to the lower edge portion 146. The T-handle fasteners 148 can be engaged with and tightened to L-brackets 152 that are secured to a front surface 154 of the enclosure 110. Note that the T-handle fasteners 148 are removed from FIG. 5 and are shown disengaged from the L-brackets 152 in FIG. 9. Other types and arrangements of fasteners can be employed to secure the viewing window 124 to the enclosure 110, including latches, clasps, clamps, and the like. Alternatively, the viewing window 124 can be arranged to include symmetric doors that are hinged along vertical edges and moveable to seal the sealable opening 112, with one or more fasteners securing the doors in the sealed position.

As illustrated in FIG. 10, in order to form a suitable seal (e.g., an airtight seal) between the viewing window 124 and the enclosure 110 about the sealable opening 112, a gasket 156 (e.g., made of a rubberized, elastomeric, foam, or other type of suitable material) is positioned between the viewing window 124 and the enclosure 110. Tightening or securing the T-handle fasteners 148 to the L-brackets 152 clamps the gasket 156 and thus substantially seals the perimeter of the viewing window 124 to the enclosure 110. Other types of sealing arrangements can be incorporated that establish the desired level of sealing engagement to inhibit cross-contamination between the external environment and the interior 114 of the enclosure 110. In a preferred form, the viewing window 124 both seals the opening 112 (i.e., functions as a cover) and allows visual access into the interior 114. Other embodiments may include an opaque "viewing window" that covers the opening 112 and a separate viewing window incorporated elsewhere in the enclosure 110 that allows visual access and a line of sight into the interior 114 when the separate cover is closed.

Figure 2:
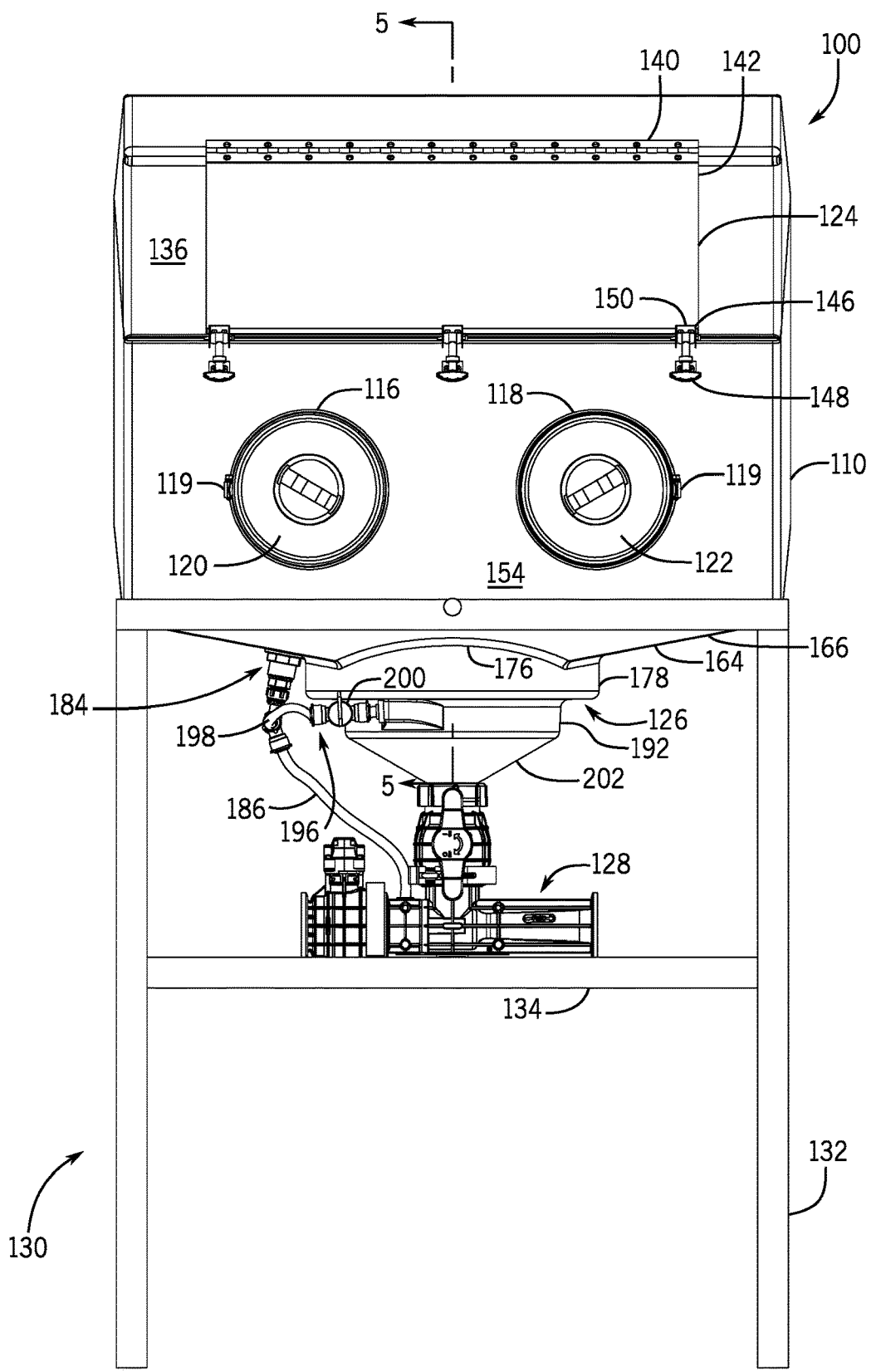
FIG. 2 is a front plan view of a closed system chemical handling and delivery system according to one embodiment of the invention.
Figure 6:
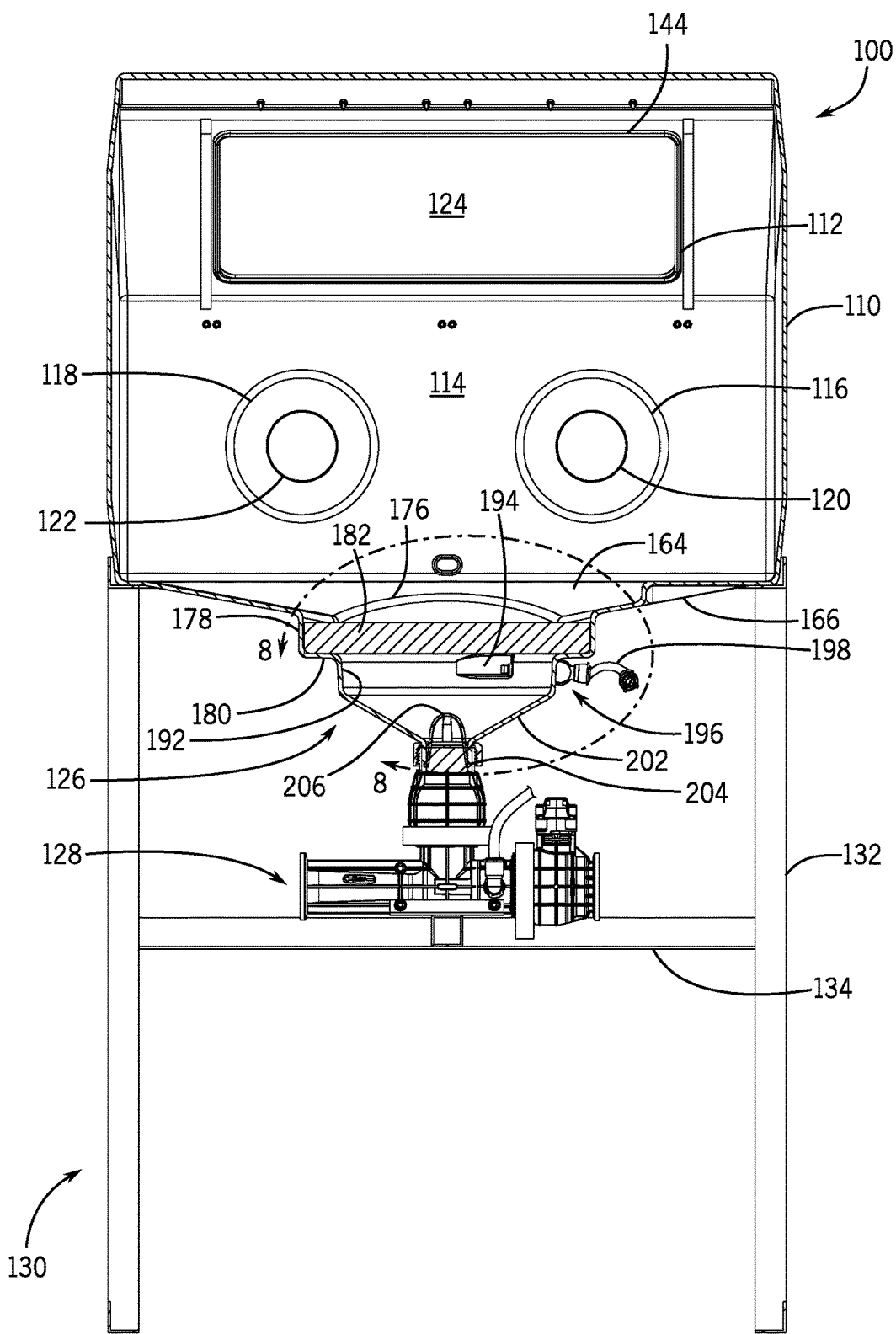
FIG. 6 is a cross-sectional view along line 6-6 shown in FIG. 4.

With specific reference to FIGS. 2 and 6, the left glove opening 116 and the right glove opening 118 are generally circular and formed in the front surface 154 of the enclosure 110. The left glove 120 is attached to the left glove opening 116 via the band clamp 119 or any other suitable fastener that establishes a generally hermetic seal between the left glove 120 and a collar 162 protruding from the front surface 158 of the enclosure 110. The right glove 122 is attached to the right glove opening 118 in a similar manner. In the example embodiment, the gloves 120, 122 each include individual contours for fingers and a thumb to allow a handler to manipulate objects (e.g., chemical containers) within the enclosure 110 even after the interior 114 of the enclosure 110 has been sealed from the external environment. The gloves 120, 122 are preferably of sufficient length to allow a handler to reach all points within the interior 114 of the enclosure 110. The gloves 120, 122 are preferably made of a suitable material (e.g., rubber) for handling the application-specific chemicals, and may further have other form factors as a particular application may require. In addition, a single or multiple gloves may be incorporated into the system 100.

With specific reference to FIGS. 2, 5, and 6-8, the substantially conical delivery drain 126 is shown and described in greater detail. The conical delivery drain 126 of the example embodiment includes an upper portion 164 integrally formed in a lower surface 166 of the enclosure 110. The upper portion 164 is generally sloped downward, in one embodiment, at approximately twenty to thirty degrees relative to the horizontal portions of the enclosure 110 (i.e., so that the effect of gravity acts to urge material downstream toward a drain opening 127 of the conical delivery drain 126). Also, the upper portion 164 preferably includes an integral, molded-in flat 174 that can establish a level horizontal surface upon which a chemical container can be set during use.

Figure 3:
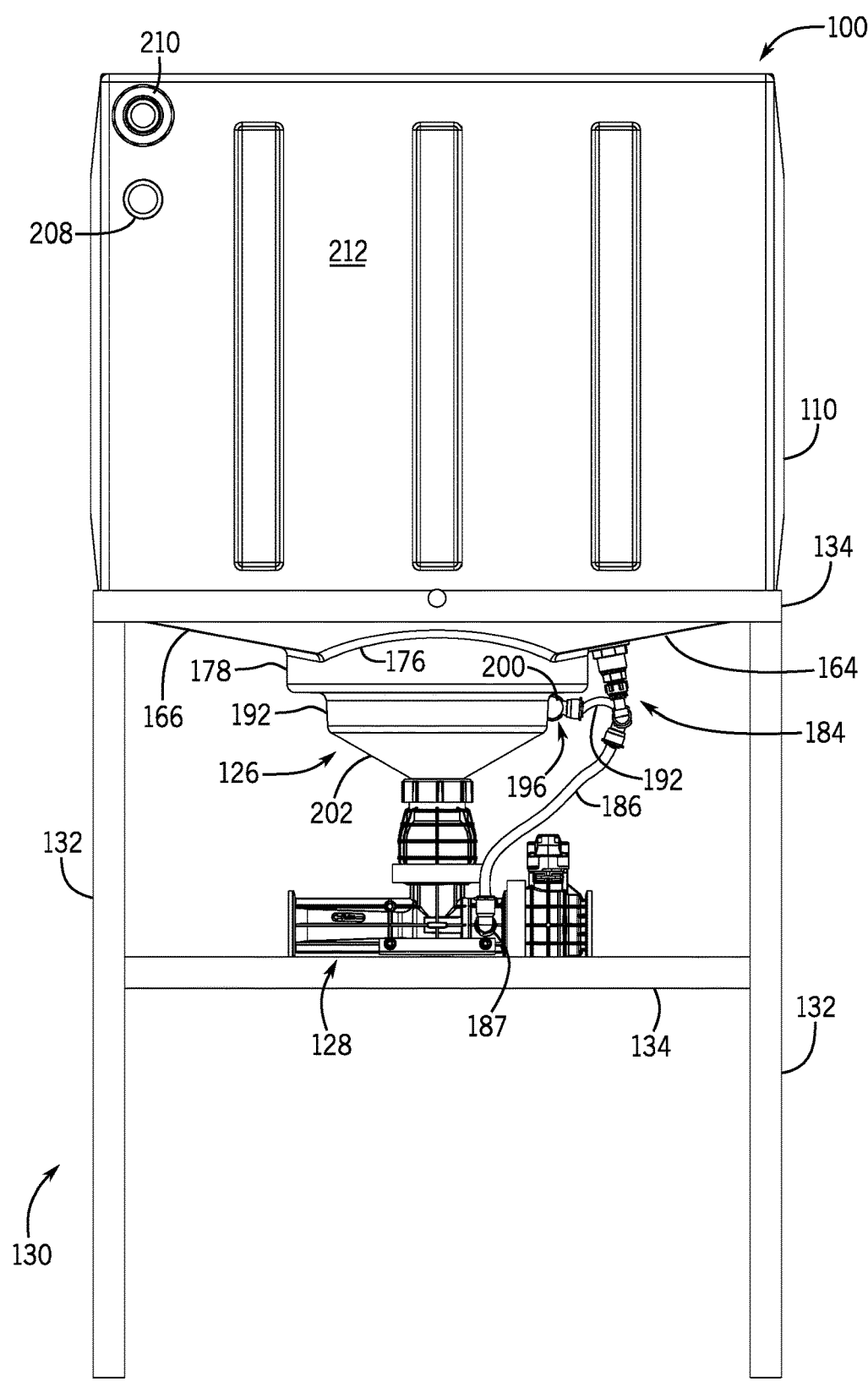
FIG. 3 is a rear plan view of the closed system chemical handling and delivery system of FIG. 2.
Figure 4:
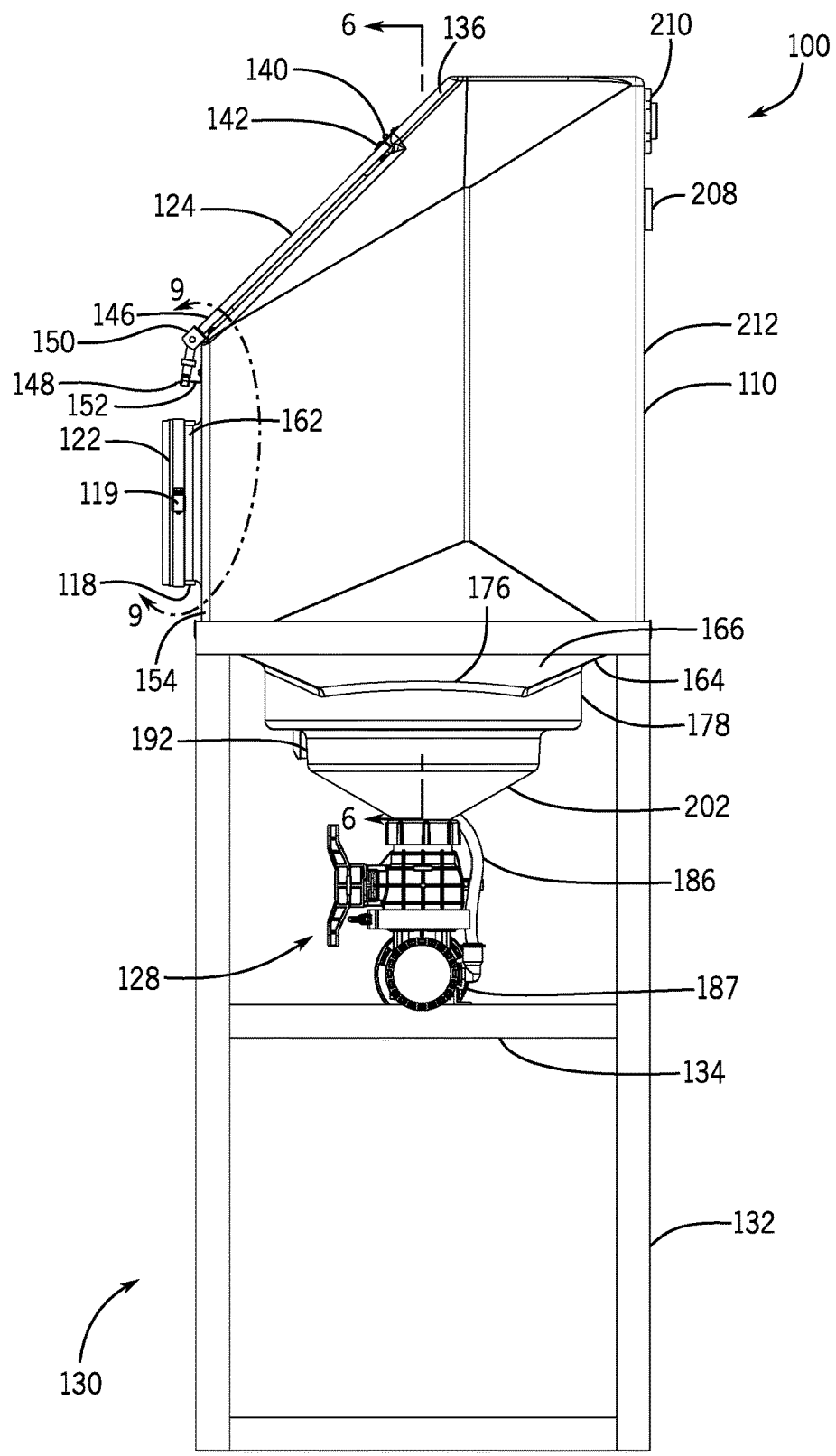
FIG. 4 a side plan view of the closed system chemical handling and delivery system of FIG. 2.
Figure 5:
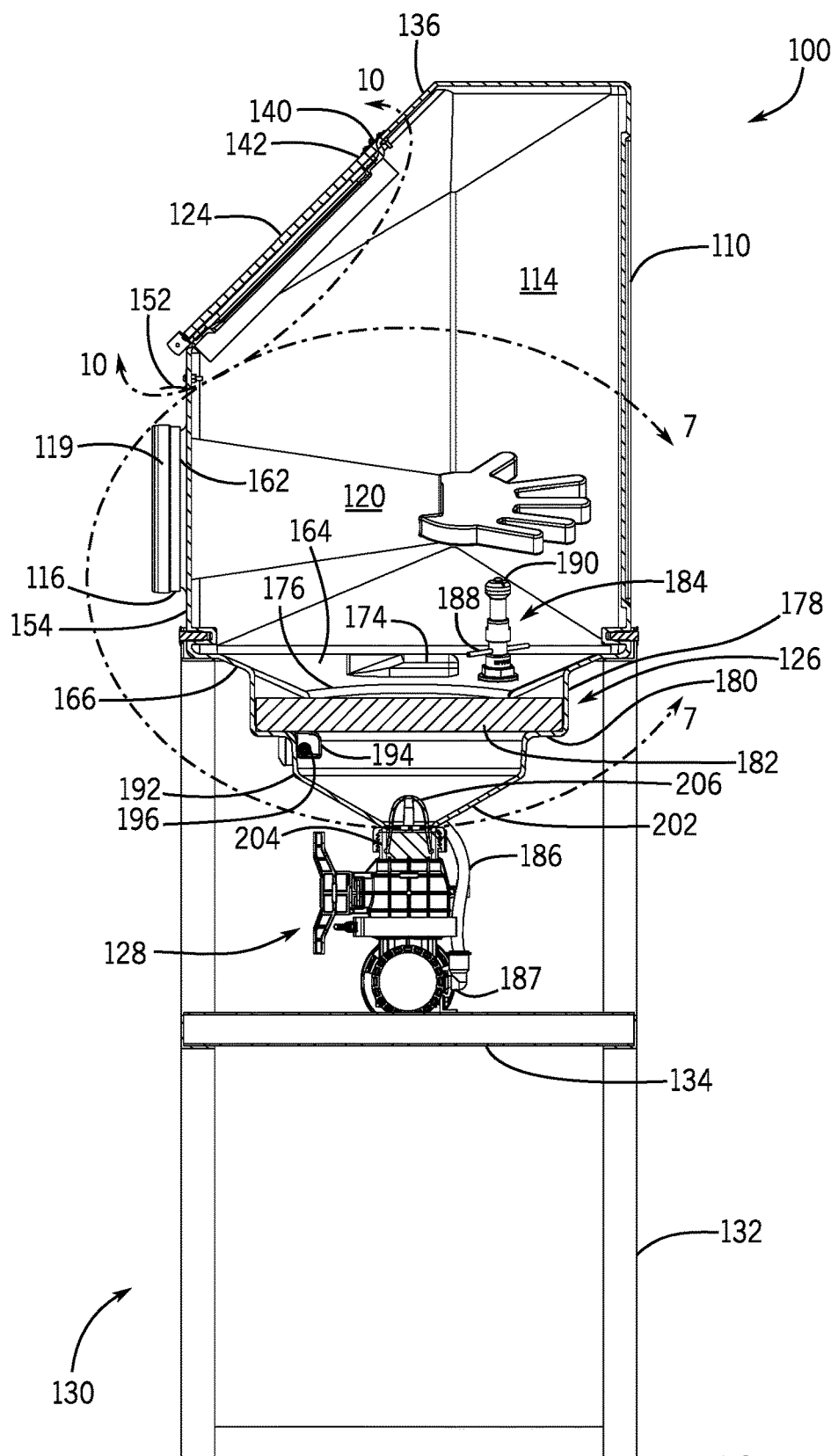
FIG. 5 is a cross-sectional view along line 5-5 shown in FIG. 2.
Figure 7:
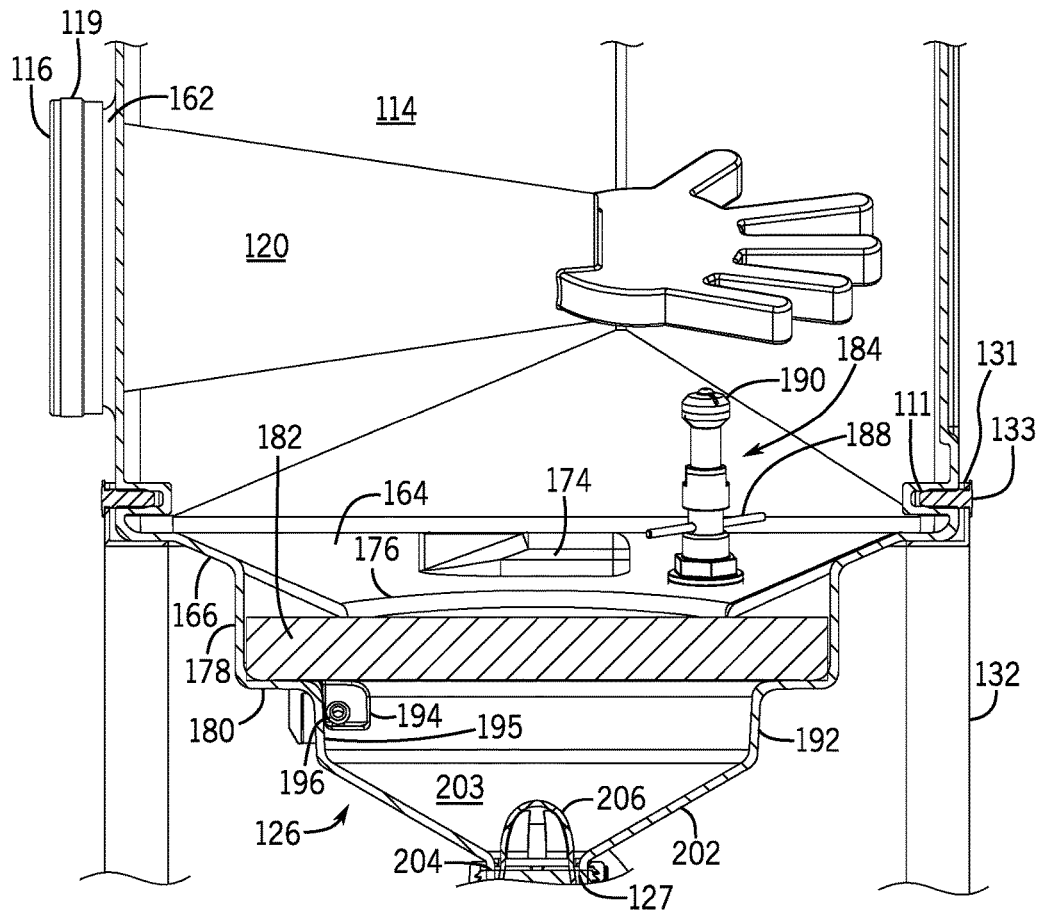
FIG. 7 is a detailed view of the area circumscribed by arc 7-7 shown in FIG. 5.
Figure 8:
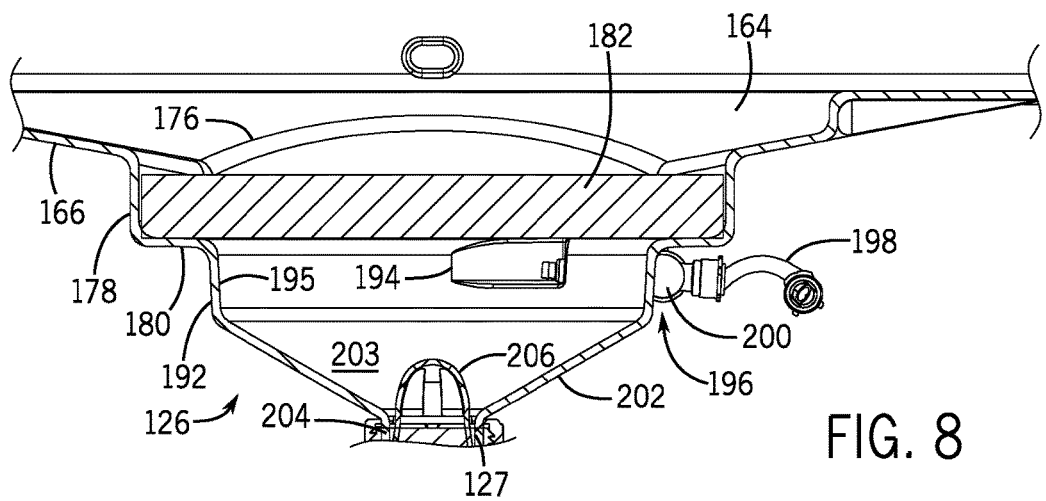
FIG. 8 is a detailed view of the area circumscribed by arc 8-8 shown in FIG. 6.

As shown in FIGS. 2, 3, and 7, a rinse nozzle assembly 184 is integrated into the upper portion 164. The rinse nozzle assembly 184 includes a wash supply line 186 extending from and in fluid communication with a port 187 on the mixing valve 128. Depressing a control valve 188 of the rinse nozzle assembly 184 allows fluid to flow from a nozzle 190 of the rinse nozzle assembly 184, for example allowing fluid to be directed into a chemical container placed over the rinse assembly 184. In one version, the nozzle 190 can incorporate rotating jets to distribute fluid throughout the chemical container, such as found in the ProClean Rotating Container Nozzle made by Hypro® of New Brighton, Minn. Various alternative rinse nozzle assembly 184 configurations can be incorporated at one or more different locations within the enclosure 110. The rinse nozzle assembly 184 may be activated by other means, such as with a manual or electronic switch located external to the enclosure 110 (e.g., an electronic foot-operated switch). In addition, the placement of the rinse nozzle assembly 184 and the gloves 120, 122 are preferably coordinated and sized to allow easy operation of the rinse nozzle assembly 184.

Returning to the chemical delivery drain 126, arcuate ridges 176 transition segments of the upper portion 164 into an intermediate portion 178 that is generally cylindrical in form factor. The intermediate portion 178 includes an annular ledge surface 180 that supports a circular grate 182 having a crisscrossing waffle construction (shown best in FIG. 11). The grate 182 can be configured to inhibit objects of a certain size from passing through the grate 182 and clogging or inhibiting passage through to the mixing valve 128. In addition, the grate 182 can provide a substantially planar surface to aid in the manipulation of chemical containers and chemicals, such as providing a flat work surface for placement of chemical containers and measurement of chemicals by a handler.

A generally cylindrical portion 192 is formed downstream, beneath and adjacent to the intermediate portion 178, and includes features to introduce fluid into the interior 114 of the enclosure 110 to aid mixing, introduction, and delivery of chemicals. The cylindrical portion 192 defines a substantially tangential, arcuate recess 194 in which a mixing nozzle assembly 196 is mounted. The arcuate recess 194 is formed in a generally vertical annular wall 195 and contoured to transition into the curvature of vertical wall 195 of the cylindrical portion 192. The mixing nozzle assembly 196 includes a nozzle supply line 198 branching from the wash supply line 186 that is in fluid communication with the mixing valve 128. An in-line valve 200 (e.g., a ball valve, gate valve, butterfly valve, needle valve, etc.) can be manipulated to control the flow of fluid through the mixing nozzle assembly 196 and into the cylindrical portion 192. Again, other types of mechanically and electrically actuated valves may be incorporated.

The cylindrical portion 192 transitions downstream into a conical portion 202 that defines the downstream portion of the chemical delivery drain 126 having the drain opening 127. In one form, the conical portion 202 defines an approximately thirty degree down-sloped surface 203 relative to a horizontal reference (i.e., an orientation that is generally perpendicular to the vertical annular wall 195). When fluid flows from the mixing nozzle assembly 196, the cylindrical portion 192 and the conical portion 202 provide a cyclonic fluid action that aids in the mixing, rinsing, and downstream delivery of chemicals, including the meltdown of flowable chemical powders. The generally tangential orientation and introduction of fluids by the mixing nozzle assembly 196 relative to the vertical annular wall 195 directs fluid from the mixing nozzle assembly 196 to establish the cyclonic action in combination with the contours of the cylindrical portion 192 and the conical portion 202.

A lower collar 204 of the conical portion 202 is configured to couple with the mixing valve 128, such as by a threaded arrangement. A cage 206 is positioned in the lower collar 204 over the drain opening 127 to aid the delivery and mixing of chemical and fluid into the mixing valve 128, while also inhibiting the downstream introduction of unwanted debris. When the mixing valve 128 is opened, a pressure differential acts to motivate the atmosphere and constituents within the enclosure 110 through the chemical delivery drain 126 and into the mixing valve 128. In the example embodiment, the mixing valve 128 can comprise an eductor valve manufactured by Hypro® of New Brighton, Minn., in connection with Hypro's Closed System Clean-load Model 3377 Series. The mixing valve 128 may also include, for instance, other types of venturi-type valve assemblies.

With specific reference to FIG. 3, the enclosure 110 includes an air filter 208 and a check valve 210 mounted to a back surface 212 of the enclosure 110. The air filter 208 and the check valve 210 are configured to regulate and equalize the environment within the enclosure 110 relative to the external environment. Other arrangements and configurations may be employed to provide the requisite regulation during operation of the closed system chemical handling and delivery system 100.

The closed system chemical handling and delivery system 100 establishes a delivery method that allows chemicals, such as from a container, to be efficiently and effectively introduced into a fluid system, such as a streamline. A chemical container (not shown) can be placed into the enclosure 110 by opening the sealable opening 112, placing the container into the interior 114, and then closing the sealable opening 112. The T-handle fasteners 148 are then engaged with and tightened to the L-brackets 152 to secure and seal the opening 112, such that the interior 114 of the enclosure 110 is substantially quarantined from the external environment.

Once the chemicals are sealed inside the enclosure 110, a handler can use the gloves 120, 122 to efficiently and effectively manipulate the chemicals (e.g., measure, mix, pour, etc.) and to operate the rinse nozzle assembly 184 (e.g., to rinse out the chemical container). For example, once a desired quantity of chemical product has been measured, a handler can pour the measured quantity of chemical(s) into the delivery drain 126, which is in selective fluid communication with the mixing valve 128 depending upon the status of the mixing valve 128. Notably, the handler can open and close the chemical containers without destruction of the container, and given the sealed interior 114 of the enclosure, can manipulate dry/powder and/or liquid chemical products. Thus, where appropriate, chemical containers can be resealed and reused, or the chemical container can be rinsed with the rinse nozzle assembly 184 for later disposal. The handler can easily view the interior 114 of the enclosure 110 through the viewing window 124, thus aiding in the manipulation of the chemical containers and control of the rinse nozzle assembly 184.

The handler can mix various chemicals and/or introduce the chemicals by operating the mixing nozzle assembly 196 and the mixing valve 128. The fluid flowing from the mixing nozzle assembly 196 flows cyclonically into the cylindrical portion 192 and spirals downward into the conical portion 202, while generally mixing with chemicals being introduced for downstream delivery through the mixing valve 128. That is, the mixing valve 128, which is in fluid communication with the chemical delivery drain 126, can be opened resulting in the chemical products within the delivery drain 126 being directed downstream through the mixing valve 128 (e.g., in response to a pressure differential established by a venturi). As the chemical product is mixed into the streamline, it passes through the mixing valve 128 and can then be pumped downstream, such as via a centrifugal base-mounted or inline pump. A desired amount of the chemical products can be introduced into the chemical delivery drain 126 and selective actuation of the mixing valve 128 can dispense and deliver the chemical products through the mixing valve 128 and onto the ultimate downstream application.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A closed system chemical handling and delivery system, comprising:
   an enclosure having a sealable opening accommodating ingress and egress of chemical containers with an interior of the enclosure;
   a glove opening formed in the enclosure to which a glove is attached to and extends into the interior of the enclosure;
   a viewing window coupled to the enclosure providing a view into the interior of the enclosure;
   a chemical delivery drain in fluid communication with the interior of the enclosure and comprising an upper portion that is sloped downward and defines an arcuate ridge that transitions from the upper portion into an intermediate portion, wherein the intermediate portion is cylindrical and defines a ledge surface, wherein the ledge surface forms into a cylindrical portion defining a vertical annular wall, and an arcuate recess formed in the vertical annular wall, wherein the arcuate recess is contoured to transition into a curvature of the vertical annular wall of the cylindrical portion; and a mixing valve in selective fluid communication with the chemical delivery drain.

2. The closed system chemical handling and delivery system of claim 1 wherein the mixing valve is a venturi-type mixing valve.

3. The closed system chemical handling and delivery system of claim 1 further comprising a rinse nozzle assembly integrated into the chemical delivery drain.

4. The closed system chemical handling and delivery system of claim 3 wherein the rinse nozzle assembly is integrated into an upper portion of the chemical delivery drain that is formed in a lower surface of the enclosure.

5. The closed system chemical handling and delivery system of claim 1 wherein the chemical delivery drain includes an upper portion sloped downward and defining an integral flat oriented horizontally.

6. The closed system chemical handling and delivery system of claim 1 further comprising a grate seated on the ledge surface.

7. The closed system chemical handling and delivery system of claim 1 further comprising a mixing nozzle assembly seated in the arcuate recess and oriented to introduce fluid tangentially to the vertical annular wall.

8. The closed system chemical handling and delivery system of claim 1 wherein the cylindrical portion transitions into a conical portion having a downstream end defining a drain opening.

9. The closed system chemical handling and delivery system of claim 8 wherein the cylindrical portion defines a down-sloped surface that is oriented approximately thirty degrees from a horizontal reference.

10. The closed system chemical handling and delivery system of claim 1 further comprising:
a check valve mounted to the enclosure; and
an air filter mounted to the enclosure.

11. A closed system chemical handling and delivery system, comprising:
an enclosure having a sloped top-front surface defining a sealable opening accommodating ingress and egress of chemical containers with an interior of the enclosure;
a pair of glove openings formed in a front surface of the enclosure to which a pair of gloves are attached to and extend into the interior of the enclosure;
a viewing window moveably coupled to the enclosure between an open position and a closed position;
a fastener engaged with the enclosure and the viewing window when the viewing window is in the closed position to seal the viewing window to the enclosure;
a chemical delivery drain in fluid communication with the interior of the enclosure, the chemical delivery drain including a cylindrical portion having a generally vertical annular wall defining an arcuate recess that is contoured to transition into a curvature of the vertical annular wall, the cylindrical portion transitions into a conical portion that defines a downstream portion of the chemical delivery drain having a drain opening;
a mixing nozzle assembly is mounted in the arcuate recess to introduce fluid from the mixing nozzle assembly cyclonically into the cylindrical portion to spiral downward into the conical portion; and
a mixing valve coupled to the drain opening and in selective fluid communication with the chemical delivery drain.

12. The closed system chemical handling and delivery system of claim 11 further comprising a molded-in flat in an upper portion of the chemical delivery drain.

13. The closed system chemical handling and delivery system of claim 11 wherein the mixing valve is a venturi-type mixing valve.

14. A closed system chemical handling and delivery method, comprising the steps of:
placing a chemical container having chemical product therein inside a closed system chemical handling and delivery system, the system comprising:
an enclosure with a sealable opening accommodating ingress and egress of the chemical container with an interior of the enclosure;
a glove opening formed in the enclosure to which a glove is attached to and extends into the interior of the enclosure;
a viewing window coupled to the enclosure providing a view into the interior of the enclosure;
a chemical delivery drain in fluid communication with the interior of the enclosure; and
a mixing valve in selective fluid communication with the chemical deliver drain;
sealing the sealable opening such that the interior of the enclosure is substantially quarantined from an external environment;
introducing a desired amount of the chemical product to the chemical delivery drain;
actuating a mixing nozzle assembly mounted in an arcuate recess of the chemical delivery drain to introduce fluid tangentially into the chemical delivery drain to mix with the desired amount of chemical products introduced to the chemical delivery drain; and
selectively actuating the mixing valve to dispense the chemical product through the mixing valve.

15. The closed system chemical handling and delivery method of claim 14 wherein the step of sealing the sealable opening comprises placing the viewing window over the sealable opening to hermetically engage with the enclosure.

16. A closed system chemical handling and delivery system, comprising:
an enclosure having a sealable opening accommodating ingress and egress of chemical containers with an interior of the enclosure;
a glove opening formed in the enclosure to which a glove is attached to and extends into the interior of the enclosure;
a viewing window coupled to the enclosure providing a view into the interior of the enclosure;
a chemical delivery drain in fluid communication with the interior of the enclosure, the chemical delivery drain including a cylindrical portion having a generally vertical annular wall defining an arcuate recess that is contoured to transition into a curvature of the vertical annular wall; and
a mixing valve in selective fluid communication with the chemical delivery drain.

17. The closed system chemical handling and delivery system of claim 16 wherein the chemical delivery drain comprises an upper portion that is sloped downward and defines an arcuate ridge that transitions from the upper portion into an intermediate portion, wherein the intermediate portion is cylindrical and defines a ledge surface.

18. The closed system chemical handling and delivery system of claim 17 wherein the ledge surface forms into the cylindrical portion.

19. The closed system chemical handling and delivery system of claim 16 further comprising a mixing nozzle assembly seated in the arcuate recess and oriented to introduce fluid tangentially to the vertical annular wall.

* * * * *